UNITED STATES PATENT OFFICE.

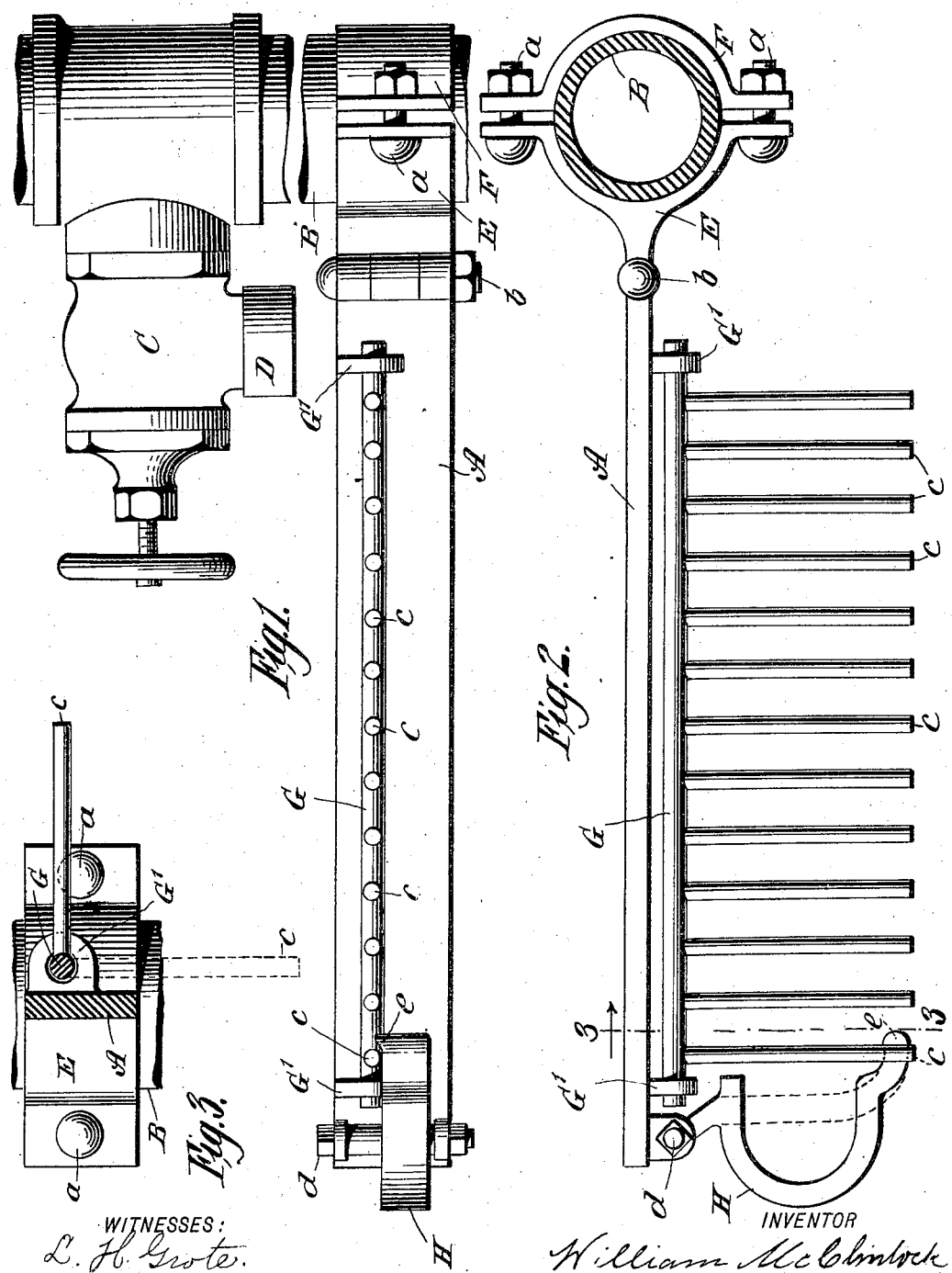

WILLIAM McCLINTOCK, OF NEW YORK, N. Y.

HOSE-RACK.

No. 844,531.  Specification of Letters Patent.  Patented Feb. 19, 1907.

Application filed January 25, 1906. Serial No. 297,889.

*To all whom it may concern:*

Be it known that I, WILLIAM McCLINTOCK, a citizen of the United States, residing at New York city, in the county and State of New York, have invented certain new and useful Improvements in Hose-Racks, of which the following is a full, clear, and exact specification, reference being had to the accompanying drawings.

This invention has relation to that variety of hose-racks which are most commonly employed for sustaining a length of fire-hose within a building or other structure in convenient position for immediate use whenever required.

The object of my invention is to provide or produce a simple and efficient hose-rack of the character above indicated which shall be of few and simple parts, not liable to get out of order, and from which the hose may be instantly and completely detached without danger of becoming tangled and upon which the hose may be easily, conveniently, and compactly located in position for subsequent use.

To accomplish the foregoing object and to secure other and further advantages in the matters of construction, operation, and use, my improvements involve a new and useful hose-rack and certain new and useful arrangements or combinations of parts and peculiarities of construction, as will be herein first fully described and then pointed out in the claims.

In the accompanying drawings, forming part of this specification, Figure 1 is a view in elevation, showing my improved form of hose-rack in position ready to receive the hose. Fig. 2 is a top or plan view corresponding with Fig. 1 and upon a plane cutting through the stand-pipe or support. Fig. 3 is a vertical section and elevation on a plane through line 3 3 of Fig. 2 and looking in the direction of the contiguous arrow, the rack being shown in full lines in horizontal position and in dotted lines swung down to unload or detach the hose.

In all these figures like letters of reference, wherever they occur, indicate corresponding parts.

A is the main arm or foundation piece of the hose-rack. This arm is made abundantly substantial, and it is hinged upon a piece or part by which it is connected with the stand-pipe or other form of support, whatever that may be.

B represents a water-supply pipe or stand-pipe, such as is usually found in buildings and other structures for service in case of fire, and this forms a very convenient support for a hose-rack, although any other support may be utilized. The pipe B is supplied with any suitable form of valve, (represented at C,) which receives the coupling of a length of fire-hose at the part represented at D. In these water-supply systems the hose is usually coupled up ready for use, the length of hose then being neatly and compactly folded or otherwise disposed so as to occupy little room, to be dismounted or detached from the rack and made ready for use by carrying it along to the proper point and opening the valve which lets the water into the hose.

E and F are two sections of a clamp suitable for application to the supply-pipe, these being arranged to be firmly bolted together around the pipe, as by bolts $a$ $a$. In case the rack is to be sustained from any other fixed support then the clamp should be correspondingly modified. The part E of the clamp when properly secured in place constitutes a substantial bracket for sustaining the bar A, the rack mounted thereon, and the weight of hose which may be located on the rack. The bar A is hinged to the supporting-bracket, as by a hinge-bolt $b$, so that the bar and the rack may be turned as may be required to locate the device in the most desirable position—as, for instance, against a wall or partition—and so that the rack may be easily swung to deliver the hose as may be required.

The rack of shelf for sustaining the hose is hinged in place upon the bar A, so that it may be permitted to turn down from its horizontal position and so that the shelf or rack when the hose is not in place thereon may be turned up, if so desired. The rack or shelf is made up of a long bar or rod G, on which are rigidly affixed a series of short bars or rods $c$ $c$, projecting at right angles to the first-named bar, the latter parts being of length about equal to or a little greater than the width of the hose when flattened out. The rod G is hinged upon bar A in any convenient manner. By preference I supply the bar A with lugs G' G', which are utilized to receive the ends of rod G. The short rods or bars c are of number corresponding to the number of loops or folds in which it may be desired to arrange the hose. When in position for use, the bars c are sustained in a substantially horizontal position, and upon them the hose is looped or folded, if so required.

Any convenient form of lock or latch may be employed to sustain the rack in horizontal position. In the form shown I employ a hinged latch, (represented at H,) the same being hinged upon the bar A by a hinge-bolt d passing through suitable lugs on the bar, the latch being arranged to swing under one of the bars c, and thus to sustain the entire rack when in place, as will be apparent. By making the latch curved, as shown in full lines in Fig. 2, it affords a convenient seat for receiving the hose-nozzle, which then projects down through the open portion of the latch. The nozzle then will operate as a convenient lever for moving the latch to release the rack. The latch may be made as indicated by the dotted lines in Fig. 2 or in other desired form and moved without reference to the hose-nozzle, the latter being rested upon the top of the hose or otherwise, as may be preferred. To prevent accidental movement of the latch, it may be provided with a slight ledge, as at e, which will prevent it from being withdrawn from under the adjacent bar c except by the application of force enough to elevate the rack to a slight degree. When the hose is in place upon the rack or shelf and the latch H withdrawn, the rack swings down, as indicated by the dotted lines in Fig. 3, and thus the hose is immediately and completely freed from the rack and dropped to the floor, whence it may be dragged or extended to any desired point within the reach of its length. Instead of looping or folding the hose upon each one of the bars c it may be located upon the top of the rack, as upon an ordinary shelf, from which it will be dumped when the rack is permitted to swing down, the same as before explained. Thus the device is adapted to receive the hose in either manner preferred. The rack may be made of any desired length, so as to accommodate any desired length of hose. After the hose has been dislodged from the rack the rack has only to be swung up to its horizontal position and latched. Then the hose may be applied over the ends of the projecting short bars, which are rigidly held by reason of their rigid connection with the hinged bar of the shelf.

Being constructed and arranged substantially in accordance with the foregoing explanation, the improved rack will be found to answer all the purposes or objects of the invention hereinbefore set forth.

Having now fully described my invention, what I claim as new herein, and desire to secure by Letters Patent, is—

1. In a hose-rack, the combination with a hinged supporting-bar, of a shelf composed of a bar hinged at its ends and having a series of short bars rigidly connected therewith, and a latch hinged upon the supporting-bar for sustaining the shelf in horizontal position, said shelf being arranged to swing down and deliver the hose when the sustaining-latch is withdrawn, substantially as and for the purposes set forth.

2. In a hose-rack, the combination with the supporting-bar hinged as explained, of a shelf hinged at its ends upon said hinged bar and comprising a series of rigidly-connected short bars, and a latch hinged upon the supporting-bar and engaging one of the short bars for sustaining the said hinged shelf in horizontal position, substantially as and for the purposes set forth.

3. In a hose-rack, the combination with the supporting-bar, of a hinged shelf mounted upon said bar, said shelf being composed of a bar hinged at its ends and a series of short bars projecting therefrom and rigidly connected therewith, and a latch hinged upon the supporting-bar for sustaining said shelf in horizontal position by contact with one of the said short bars, substantially as and for the purposes set forth.

4. In a hose-rack, the combination of the hinged shelf composed of a bar and a number of short bars projecting therefrom and rigidly connected therewith mounted upon a supporting-bar, and a curved hinged latch also mounted upon the supporting-bar and arranged to receive the hose-nozzle and to sustain and release the hinged shelf, substantially in the manner and for the purposes set forth.

5. The herein-described hose-rack comprising a clamp, a sustaining-bar hinged thereon, a shelf hinged upon the sustaining-bar, said shelf being composed of a bar or rod and short rods projecting therefrom and rigidly connected therewith, a latch hinged upon the sustaining-bar and arranged to sustain the shelf by contact with one of the rigid short bars thereof and to receive the hose-nozzle, the parts being arranged for operation substantially as set forth.

In testimony whereof I have signed my name to this specification in the presence of two subscribing witnesses.

WILLIAM McCLINTOCK.

Witnesses:
L. H. GROTE,
WORTH OSGOOD.